US008635214B2

(12) United States Patent
Blass et al.

(10) Patent No.: US 8,635,214 B2
(45) Date of Patent: Jan. 21, 2014

(54) IMPROVING RESULTS FROM SEARCH PROVIDERS USING A BROWSING-TIME RELEVANCY FACTOR

(75) Inventors: Oscar J. Blass, Boynton Beach, FL (US); Oswaldo Gago, Margate, FL (US); Brennan D. Monteiro, Boca Raton, FL (US); Paritosh D. Patel, Parkland, FL (US); Roberto Vila, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 1863 days.

(21) Appl. No.: 11/460,038

(22) Filed: Jul. 26, 2006

(65) Prior Publication Data
US 2008/0059446 A1  Mar. 6, 2008

(51) Int. Cl.
   *G06F 7/00*  (2006.01)
   *G06F 17/30*  (2006.01)
(52) U.S. Cl.
   USPC ........................................ 707/731
(58) Field of Classification Search
   USPC .............. 707/3, 731; 375/148–149, 354
   See application file for complete search history.

(56) References Cited

U.S. PATENT DOCUMENTS

| | | | |
|---|---|---|---|
| 6,041,323 A | 3/2000 | Kubota | |
| 6,421,675 B1 * | 7/2002 | Ryan et al. ............... | 1/1 |
| 6,473,751 B1 | 10/2002 | Nikolovska et al. | |
| 6,714,929 B1 | 3/2004 | Micaelian et al. | |
| 6,718,323 B2 | 4/2004 | Davies et al. | |
| 7,003,513 B2 | 2/2006 | Geiselhart | |
| 7,020,651 B2 | 3/2006 | Ripley | |
| 2005/0203888 A1 | 9/2005 | Woosley et al. | |

FOREIGN PATENT DOCUMENTS

WO   WO0142880 A2   6/2001

OTHER PUBLICATIONS

Kerschberg, L., et al., "A Semantic Taxonomy-Based Personalizable Meta-Search Agent", 2nd Int'l Proc. Web Info. Sys. Eng., WISE, vol. 1, pp. 4-55, 2001.
Diligenti, M., et al., "A Unified Probabilistic Framework for Web Page Scoring Systems", IEEE Trans. on Knowledge & Data Eng., vol. 16, No. 1, pp. 4-16, Jan. 2004.

* cited by examiner

*Primary Examiner* — Usmaan Saeed
*Assistant Examiner* — Cecile Vo
(74) *Attorney, Agent, or Firm* — Patents on Demand P.A.; Brian K. Buchheit; Scott M. Garrett

(57) ABSTRACT

A method for searching Web pages that begins with the identification of query criteria entered into a search provider. A set of Web pages that satisfies the query criteria are determined. Then, a page ranking is ascertained for each Web page in the set. The Web pages are presented in order by page ranking. The page ranking is based upon at least one relevancy factor that includes a browsing-time factor. The browsing-time factor can be calculated from browsing behavior exhibited by users, who provided similar query criteria. The set of users from which the browsing-time factor is calculated can include a current user, a set of users sharing characteristics with the current user, and/or a general set of users. Browsing behavior can include time spent at a Web page, where the browsed Web page is a page that was previously presented as a search result for the similar query criteria.

14 Claims, 5 Drawing Sheets

IMPROVING RESULTS FROM SEARCH PROVIDERS USING A BROWSING-TIME RELEVANCY FACTOR

BACKGROUND

1. Field of the Invention

The present invention relates to the field of Web page searches and, more particularly, improving search results using a browsing-time relevancy factor.

2. Description of the Related Art

Large knowledge stores, such as a corporate intranet or the Internet, contain such a vast amount of information that finding accurate information in a timely manner is a daunting task. A variety of search engines exist that promise to provide users with fast and, more importantly, accurate results for their queries. However, the methods used by conventional search engines to determine the ordering of search results in terms of relevance to a user's query can be externally manipulated. This manipulation decreases the capability of conventional search engines to provide accurate results, increases the time spent by users to identify relative information, and increases a user's sense of frustration.

For example, the presence of the search terms or query criteria in the text of a Web page typically implies that the Web page is relevant to the user's query. Therefore, the more times the query criteria appears on a Web page, the more relevance the page is to the query and the higher it should appear in the results list. This is a part of the simple relevancy logic of many early search engines. Once Web page authors realized that key word repetition in page content increased a page's ranking, the validity of this relevancy factor diminished. By repeating words "invisibly", white text on a white background, a Web page author could increase a page's ranking without providing additional relevance or information. Similarly, unrelated words can be added to a Web page so that the page is included in the results of more popular search terms.

Conventional search engines have attempted to overcome the flagrant abuses of their ranking algorithms. Many popular search engines use a variety of factors and weightings to determine the relevancy of a Web page to the entered query criteria. Despite these improvements, the results provided are still skewed. For example, many search engines sell organizations the ability to increase the ranking of Web pages from a designated Web site.

Further, many of the factors used by conventional search engines to combat abuse inject additional biases. For example, the age of a Web page or Web site is often used to determine a sense of legitimacy. This factor, meant to contend with influxes of fad and fictitious Web sites, precludes relevant content simply because its host is newer than the existing majority. Another factor uses a frequency with which a Web page is accessed, under the assumption that popular Web pages are more relevant to users than less popular ones. This popularity factor is abused by automated systems that iteratively access a Web page, with the explicit purpose of artificially inflating a popularity factor associated with the page.

SUMMARY OF THE INVENTION

The present invention discloses a solution for improving results from a search provider using a browsing-time relevancy factor. The browsing-time factor represents a time that a user spends viewing a Web page, which was Web page returned by a search provider responsive to user provided query criteria. It is assumed that a user will spend an appreciable time browsing a Web page that is relevant for a user's query and less time viewing an irrelevant Web page. The present invention overcomes the manipulation of search results by external and irrelevant factors by including the influence of actual result usage.

The present invention can be implemented in accordance with numerous aspects consistent with material presented herein. For example, one aspect of the present invention can include a method for searching Web pages that begins with the identification of query criteria entered into a search provider. A set of Web pages that satisfy the query criteria can be determined. Then, a page ranking can be ascertained for each Web page in the set. The Web pages can be presented in order by page ranking. The page ranking can be based upon at least one relevancy factor that includes a browsing-time factor. The browsing-time factor can be based upon a time spent at a browsed Web page.

Another aspect of the present invention can include a method for ordering a set of Web pages that satisfy query criteria. Each Web page in a set of Web pages that satisfy the query criteria can be assigned a page ranking value. The Web pages can then be ordered in the set in accordance with the assigned page ranking values. Subsequently, the Web pages can be presented in order within the search Web page where the query criteria were entered. The page ranking value can be based at least in part upon a browsing-time factor. The browsing-time factor can be based at least in part upon a time spent by at least one user at an associated browsed Web page, during a previous query having criteria similar to the query criteria.

Yet another aspect of the present invention can include a system for searching Web pages. This system can include a search provider and a result refinement engine. The search provider can be configured to search Web pages that satisfy user-entered query criteria. The result refinement engine can be configured to apply relevancy algorithms that include a browsing-time factor.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
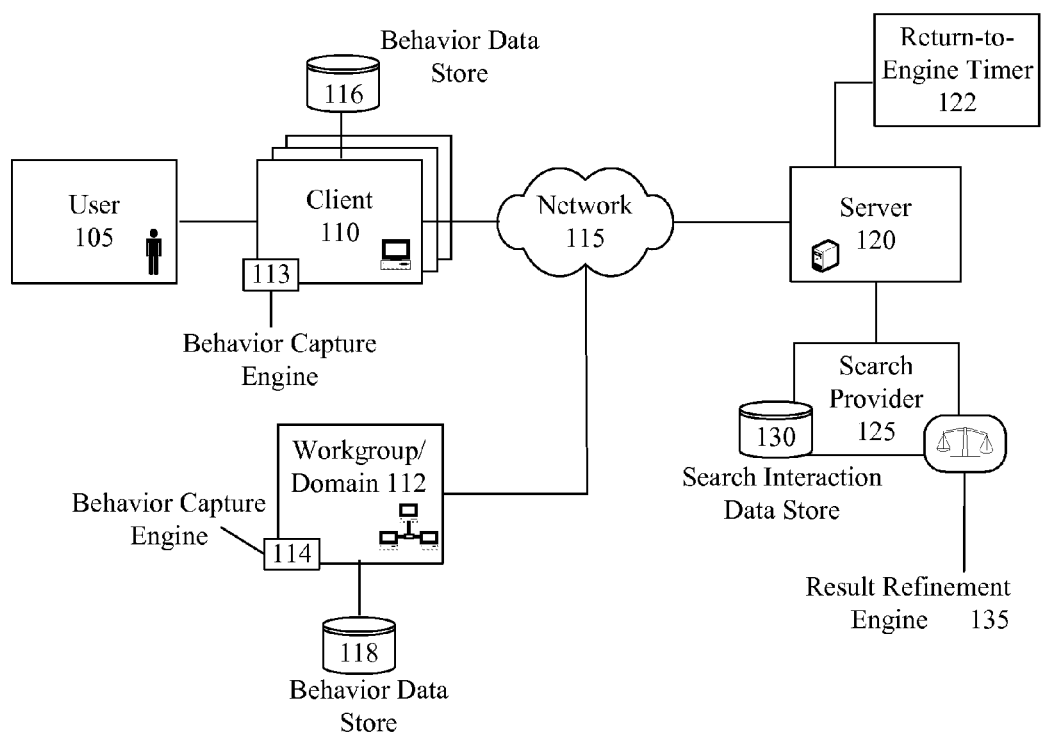
FIG. 1 is a schematic diagram illustrating a system for searching Web pages utilizing a browsing-time factor in accordance with embodiments of the inventive arrangements disclosed herein.

FIG. 1 is a schematic diagram illustrating a system 100 for searching Web pages utilizing a browsing-time factor in accordance with embodiments of the inventive arrangements disclosed herein. System 100 can include client 110, workgroup/domain 112, and server 120 communicatively linked through network 115.

Client 110 is used by user 105 to access search provider 125 of server 120 in order to search Web pages contained within network 115. Client 110 can be any of a variety of computing devices including, but not limited to, a personal computer, a kiosk, a personal data assistant (PDA), a mobile phone, and the like. Contained within or attached to client 110 are behavior capture engine 113 and behavior data store 116.

Behavior capture engine 113 can include a set of machine-readable instructions capable of capturing data related to actions performed by user 105 on client 110. Behavior capture engine 113 can be any of a variety of software application types including, but not limited to, a thin client, a client application, a local stand-alone application, a Web-based application, an applet, and the like. The data captured by behavior capture engine 113 is stored within behavior data store 116.

In another contemplated embodiment, behavior capture engine 113 and behavior data store 116 may be omitted from client 110 in favor of the addition of behavior capture engine 114 and behavior data store 118 to workgroup/domain 112. This configuration allows for system flexibility and an efficient use of system resources. For instance, client 110 may not have the proper system resources to accommodate behavior capture engine 113 and behavior data store 116. Additionally, this configuration allows for a centralized location of data and software. Further, this configuration permits Web behavior to be captured for a group of users, in an anonymous and/or transparent fashion.

Server 120 can be any type of network server that can support search provider 125 and return-to-engine timer 122. For example, a server 120 can includes a Web server that utilizes one or more search engines to present Web pages to users believed to be relevant for user specified query criteria. Server 120 can include a Web server associated with a single search engine, such as a Web server for GOOGLE.COM or YAHOO.COM, as well as a Web server associated with a metasearch engine, such as a Web server for DOGPILE.COM or MAMMA.COM, that utilizes multiple search engines.

Return-to-engine timer 122 can include a set of machine-readable instructions capable of measuring the elapsed time before user 105 returns to search provider 125 for the purposes of determining a browsing-time factor. Return-to-engine time 122 can be any of a variety of software application types including, but not limited to, a server application, a local stand-alone application, a Web-based application, an applet, and the like.

Search provider 125 can be any type of software application or search engine capable of searching Web pages and utilizing result refinement engine 135 and search interaction data store 130. Search provider 125 can be implemented in a variety of manners including, but not limited to, a conventional search engine, a search script, a meta-search engine, and the like. Search provider 125 can generate responses to query criteria using crawler-based search engines including, but not limited to, ALLTHEWEB, ALTAVISTA, GOOGLE, INKTOMI, TEOMA, and combinations or derivatives thereof.

Result refinement engine 135 can include a set of machine-readable instructions capable of determining Web page relevancy based in part upon a browsing-time factor. The browsing-time factor can be one of many factors used by a search engine to determine a relevancy of a set of Web pages for user provided query criteria. Result refinement engine 135 can be implemented as any of a variety of software application types including, but not limited to, a web service, a server application, a local stand-alone application, a Web server application plug-in component, an applet, and the like. The data required by result refinement engine 135 is stored within search interaction data store 130.

As used herein, presented data stores, including stores 116, 118, and 130, can be a physical or virtual storage space configured to store digital information. Data stores 116, 118, and 130 can be physically implemented within any type of hardware including, but not limited to, a magnetic disk, an optical disk, a semiconductor memory, a digitally encoded plastic memory, a holographic memory, or any other recording medium. Each of the data stores 116, 118, and 130 can be a stand-alone storage unit as well as a storage unit formed from a plurality of physical devices. Additionally, information can be stored within data store 116, 118, and/or 130 in a variety of manners. For example, information can be stored within a database structure or can be stored within one or more files of a file storage system, where each file may or may not be indexed for information searching purposes. Further, data stores 116, 118, and/or 130 can utilize one or more encryption mechanisms to protect stored information from unauthorized access.

Network, 115 can include any hardware/software/and firmware necessary to convey data encoded within carrier waves. Data can be contained within analog or digital signals and conveyed though data, or voice channels. Network 115 can include local components and data pathways necessary for communications to be exchanged among computing device components and between integrated device components and peripheral devices. Network 115 can also include network equipment, such as routers, data lines, hubs, and intermediary servers which together form a data network, such as the Internet. Network 115 can also include circuit-based communication components and mobile communication components, such as telephony switches, modems, cellular communication towers, and the like. Network 115 can include line based and/or wireless communication pathways.

Figure 2:
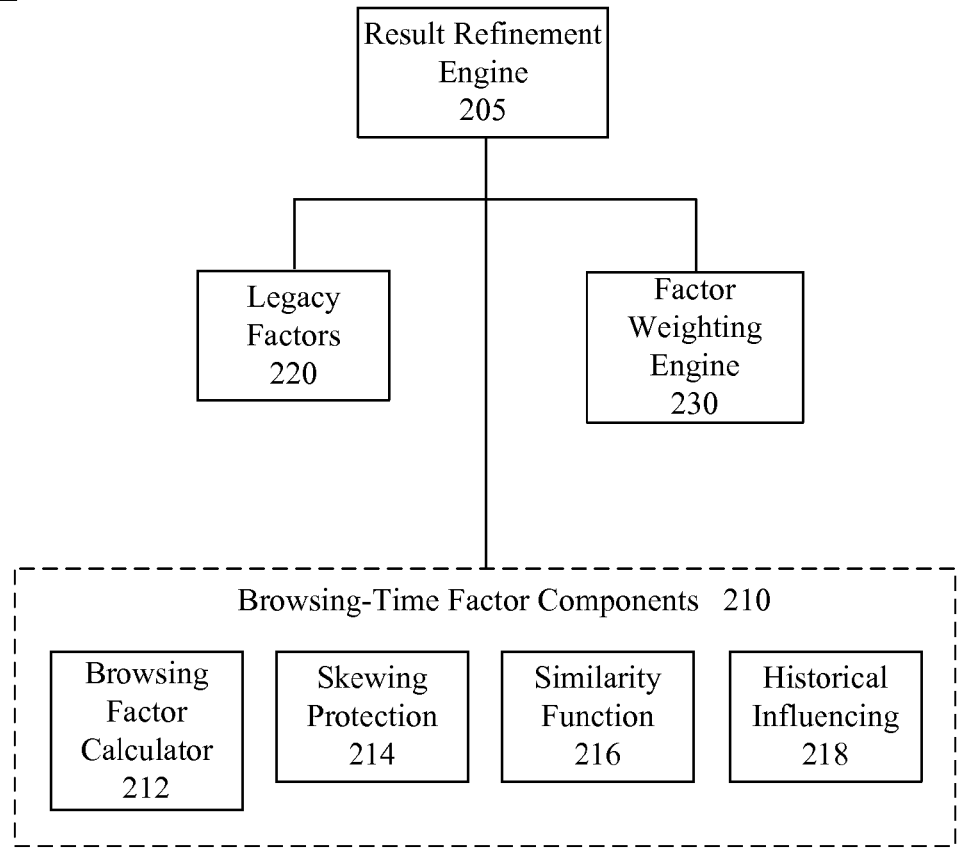
FIG. 2 is an illustration of the components of a result refinement engine in accordance with an embodiment of the inventive arrangements disclosed herein.

FIG. 2 is an illustration 200 of the components of result refinement engine 205 in accordance with an embodiment of the inventive arrangements disclosed herein. Illustration 200 can be performed in the context of system 100. The example of illustration 200 is not limited in this regard, however, and can be performed in the context of any system supporting the use of a browsing-time factor for improving Web page search results.

Result refinement engine 205 can contain legacy factors 220, factor weighting engine 230, and browsing-time factor components 210. Browsing-time factor components 210 can contain browsing factor calculator 212, skewing protection 214, similarity function 216, and historical influencing 218.

Browsing factor calculator 212 can represent the algorithms and corresponding values of significance associated with the calculation of the browsing-time factor for a browsed Web page. Browsing factor calculation 212 can utilize the timing data gathered by return-to-engine timer 122 and/or behavior capture engine 113-114 of system 100. The browsing-time factors calculated by browsing factor calculator 212 can be maintained within search interaction data store 130 of system 100.

The browsing-time factor computed by the browsing factor calculator 212 is a factor used to generally denote browsing behavior and is not to be construed as limited to a blunt time spent browsing a Web page. Instead, the browsing-time factor can be include any condition relating to browsing that indicates a user interest in a browsed Web page, whether that interest is positive or negative. Additional considerations, such as a time-out period of inactivity that indicates abandonment of a computer, as opposed to interest in a Web page and a subsequent return to a browsed Web page can be adjusted for by calculator 212.

For example, positive adjustment events for calculator 212 that indicate user interest can include such events as scrolling to see a complete Web page, viewing an entire Web page, downloading content from a browsed Web page, printing a Web page, copying content from a Web page, making a purchase from a Web page, adding a Web page to a list of bookmarked pages, and the like. Examples of negative adjustment events for calculator 212 can include not viewing an entire Web page, blocking a Web page using a firewall, and the like.

The calculator 212 can apply different point values to each of the positive and negative factors and can calculate a browsing-time factor based upon a total of these points. In one embodiment, points assigned based upon time spent at a Web page can be assigned based on the below table, which assumes that a browsing-time factor is computed as a function of a return-to-search-engine-time, which can be a computation based upon data available to return-to-engine timer 122 of system 100.

| Points | Calculation Event |
|---|---|
| −5 | Less than five seconds and then viewed the next result |
| 0 | Between five and ten seconds and then viewed the next result |
| 5 | Between ten and twenty seconds and then viewed the next result |
| 10 | Between twenty and thirty seconds and then viewed the next result |
| 15 | If a searcher doesn't return for another result that day |
| 20 | If the searcher returned to a search provider less than an hour later with a new phrase with a similarly score of less than 0.75 |
| 25 | If the searcher returned to a search provider less than an hour later with a new phrase with a similarly score of less than 0.50 |
| 30 | If the searcher returned to a search provider less than an hour later with a new phrase with a similarly score of less than 0.20 |
| 40 | If the searcher returned to a search provider less than an hour later with a new phrase with a similarly score of less than 0.10 |
| 50 | If the searcher returned to a search provider less than an hour later with a new phrase with a similarly score of less than 0.05 |

In a different embodiment, points for a browsing-time factor can be based in part upon behavioral events, such as those shown in a table below, which can be gathered by behavioral capture engine 113 and/or 114 of system 100. The behavioral events can optionally be combined with browsing times (not shown).

| Points | Calculation Event |
|---|---|
| −70 | If first searcher firewalled page |
| 10 | If first searcher viewed entire page (i.e. scrolled down) |
| 20 | If first searcher downloaded a file |
| 25 | If first searcher printed the page |
| 30 | If first searcher made a purchase |
| 50 | if first searcher made a large purchase |
| 55 | If first searcher bookmarked page |

The tables, point values, and calculations events are not intended to be exhaustive, but are instead intended to illustrate a concept expressed herein. The various calculation events and point values can be user configurable and/or administrator configurable values. Further, an optimization engine (not shown) can automatically adjust the point-values and/or events based upon analyzed historical data.

Skewing protection 214 can represent the algorithms and corresponding values of significance meant to counteract excessive external influencing of search results. Web site or user identifications can be designated with corresponding adjustments in order to limit the effect of the designated Web site or user. For example, the influence of users who test Web pages for quality assurance reasons can be reduced to reflect their visitation of Web pages for non-informational purposes. Skewing protection 214 can assure that no single computing device, user, and/or IP address can dominate a browsing-time factor. For example, skewing protection 214 can disregard input from a particular computing device, user, and/or IP address after a fixed number of accesses per time period have occurred, which prevents or limits the effect of purposeful biasing of a browsing-time factor. The information necessary for the functioning of skewing protection 214 can be maintained within search interaction data store 130 of system 100.

Similarity function 216 can represent the algorithms and corresponding values of significance to determine the similarity of the current query criteria to the query criteria of previous searches performed by other users. For example, the similarity function 216 can ensure that a query criteria of "cars" is similar to query criteria of "automobiles" and is thus subject to similar handling from a browsing-time factor perspective. This can be accomplished in a variety of manners, such as the use of existing algorithms for the determination of string similarity, such as Hamming distance based algorithm. Levenshtein distance based algorithm, a Huffman compression based similarly algorithm, or an internally developed criteria set or algorithm. The information necessary for the functioning of similarity function 216 can be maintained within search interaction data store 130 of system 100.

Historical influencing 218 can represent the algorithms and corresponding values of significance associated with the actions performed by a current user and/or other users during previous, similar searches. For instance, a user revisiting a Web page multiple times after an initial search, such as five visits within a week, can indicate that the Web page was relevant to the user. The influence data for browsed Web pages generated by historical influencing 218 can be maintained within search interaction data store 130 of system 100.

Legacy factors 220 can include factors, other than the browsing-time factor, used to determine a Web page's relevancy for user provided query criteria. GOOGLE.COM, for example, uses over two hundred relevancy factors, which are each considered legacy factors 220 for purposes of the present invention.

Factor weighting engine 230 can represent the algorithms for synthesizing legacy factors 220 and browsing-time factor components 210 into a single value denoting page ranking. Different weights can be applied to each of the different factors to make one factor more significant than others For example, the factor weighting engine 230 can assign a weight of twenty percent (20%) to a browsing-time factor and weights totally eighty percent (80%) to a combination of all other relevancy factors.

Figure 3:
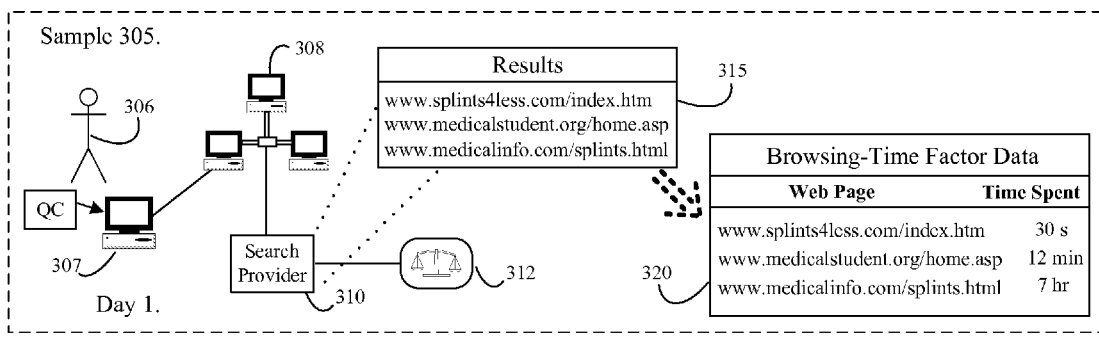
FIG. 3 is a collection of illustrations depicting the influence of a browsing-time factor on Web page search results in accordance with an embodiment of the inventive arrangements disclosed herein.
Figure 3:
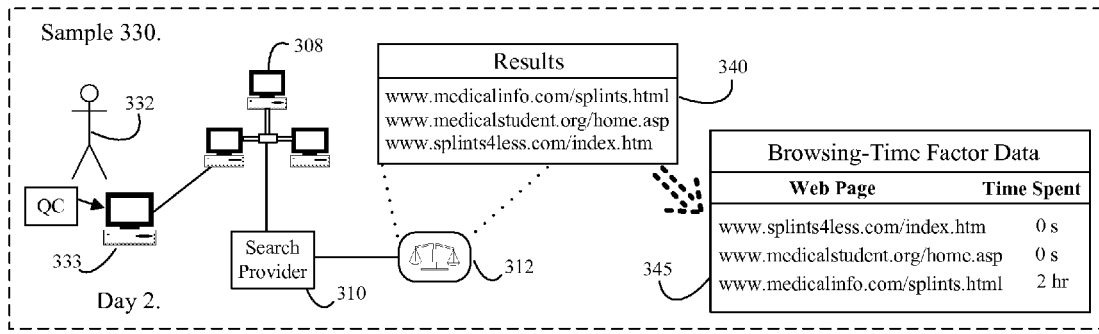

FIG. 3 is a collection 300 of illustrations depicting the influence of a browsing-time factor on Web page search results in accordance with an embodiment of the inventive arrangements disclosed herein. Collection 300 can be performed in the context of systems 100 and 200. The example of collection 300 is not limited in this regard, however, and can be performed in the context of any system supporting the use of a browsing-time factor for improving Web page search results.

Collection 300 contains query criteria 301, sample 305, and sample 330. Query criteria 301 contains text for purpose of searching Web pages to find those Web pages that relevant to the text. For illustrative purposes, query criteria 301 is defined as containing the text, "Should I wear my splint to bed?" and is used in both sample 305 and sample 330. Also, for the sake of simplicity, the illustrations of collection 300 are set in a small-scale environment, such as a corporate network.

Sample 305 depicts the events that occur on Day 1. It should be appreciated that the designation "Day 1" is merely for establishing a chronological ordering of events and is not meant to express any actual calendar date. Additionally, "Day 1" designates an initial state of the system being depicting, such as system 100. This signifies that no data exists in the system for the application of a browsing-time factor at this time. Although it is possible for the other components of the results refinement engine to have influence in an initial system state, those influences are not the focus of this collection of illustrations.

In sample 305, user 306 enters query criteria 301 into search provider 310 via client 307 and network 308. Since this is the first query being performed, result refinement engine 312 does not have any data to rank the Web pages listed in search results 315. Therefore, search results 315 represents the set of Web pages determined by search provider 310 as applicable to query criteria 301 and untouched by result refinement engine 312. For illustrative purposes, search results 315 contains these Web pages in the following order: www.splints4less.com/index.htm, www.medicalstudent.org/home.asp, and www.medicalinfo.com/splints.html.

Search results 315 is displayed to user 306 and browsing-time factor data 320 is collected. Browsing-time factor data 320 represents the amount of time spent by user 306 at the Web pages listed in search results 315. For illustrative purposes, browsing-time factor data 320 shows that user 306 spent 30 seconds at www.splints4less.com/index.htm, 12 minutes at www.medicalstudent.org/home.asp, and 7 hours at www.medicalinfo.com/splints.html. This information can be collected by behavior capture engine 113 or 114 and stored in behavior data store 116 or 118 of system 100.

Sample 330 depicts the events that occur on Day 2. It should be appreciated that the designation "Day 2" is meant to establish that sample 330 occurs after sample 305 chronologically and is not meant to express any actual calendar date.

In sample 330, user 332 enters query criteria 301 into search provider 310 via client 333 and network 308. Result refinement engine 312 can apply browsing-time factor data 320 of sample 305 to the set of Web pages determined applicable to query criteria 301 by search provider 310 to rank the Web pages in a manner that is relevant to usage. Search results 340 represents the set of Web pages in order by the page ranking determined by result refinement engine 312. The Web pages contained in search results 340 are in the order: www.medicalinfo.com/splints.html, www.medicalstudent.org/home.asp, and www.splints4less.com/index.htm. This order reflects browsing-time factor data 320 by ranking the Web pages by the amount of time spent at the page by user 306. Since user 306 spent the most time at www.splints4less.com/index.htm, user 306 found the information at this Web page the most helpful for query criteria 301. Therefore, user 332 should be able to find their sought after information at this Web page as well.

Browsing-time factor data 345 represents the amount of time spent by user 332 at the Web pages listed in search results 340. For illustrative purposes, browsing-time factor data 345 shows that user 332 spent 0 seconds at www.splints4less.com/index.htm, 0 seconds at www.medicalstudent.org/home.asp, and 2 hours at www.medicalinfo.com/splints.html. This information can be collected by behavior capture engine 113 or 114 and stored in behavior data store 116 or 118 of system 100. By using browsing-time factor data 320 to influence search results 340, user 332 is able to find the information pertinent to their search quicker and more accurately than user 306.

It should be appreciated that the accuracy of the influence of a browsing-time factor increases as the quantity of users and similar searches increases. It should also be appreciated that the example of FIG. 3 is an overly simplified example, which in addition to the stated browsing times could utilize any of the previously noted calculation events when calculating the browsing-time factor. That is, time spent browsing a page is just one of many browsing-behavior based components that can be used to calculate the browsing-time factor.

Figure 4:
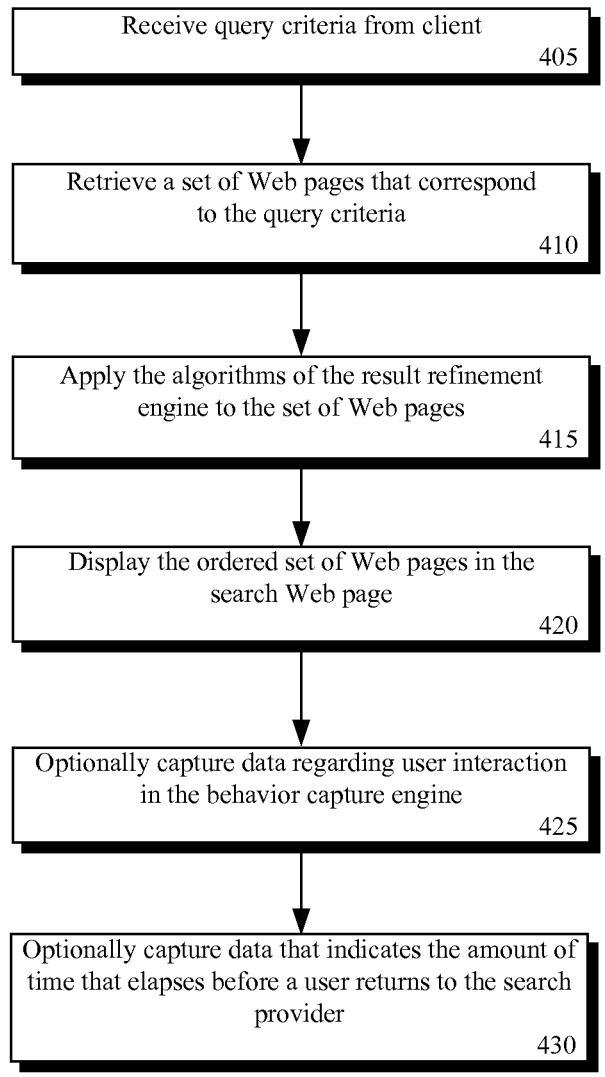
FIG. 4 is a flow chart of a method for searching Web pages utilizing a browsing-time factor in accordance with an embodiment of the inventive arrangements disclosed herein.

FIG. 4 is a flow chart of a method 400 for searching Web pages utilizing a browsing-time factor in accordance with an embodiment of the inventive arrangements disclosed herein. Method 400 can be performed in the context of system 100 and 200 or in the context of any other system supporting the use of a browsing-time factor for improving Web page search results.

Method 400 can begin in step 405, where query criteria are received from the client. In step 410, the search provider retrieves a set of Web pages that correspond to the query criteria. Next, the search provider applies the algorithms of the result refinement engine to the set of Web pages in step 415. Once the set of Web pages has been ordered by the result refinement engine, step 420 occurs wherein the set of Web pages are displayed within the search Web page.

In step 425, behavior capture engine optionally captures data that corresponds to how a user interacts with the ordered set of Web pages. Data can optionally be captured that measures the elapsed time before a user returns to the search provider in step 430. This data can be captured by return-to-engine timer 122 of system 100 for use in future applications of the algorithms of result refinement engine 135.

Figure 5:
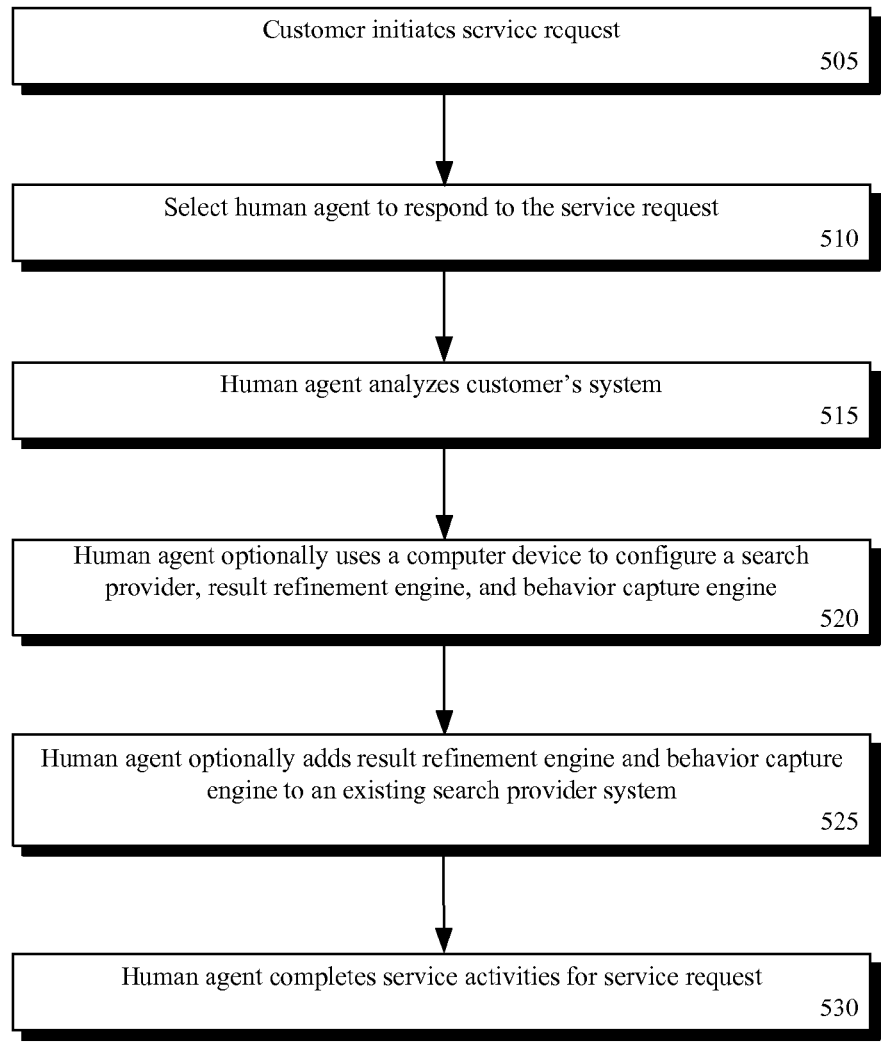
FIG. 5 is a flow chart of a method where a service agent can configure a system for searching Web pages utilizing a browsing-time factor in accordance with an embodiment of the inventive arrangements disclosed herein.

FIG. 5 is a flow chart of a method 500 where a service agent can configure a system for searching Web pages utilizing a browsing-time factor in accordance with an embodiment of the inventive arrangements disclosed herein. Method 500 can be preformed in the context of systems 100, 200, and/or method 400.

Method 500 can begin in step 505, when a customer initiates a service request. The service request can be a request for a service agent to establish a new system for searching Web pages. The service request can also be a request to troubleshoot a problem with an existing Web page searching system or to modify the relevancy factors of an existing result refinement engine.

In step 510, a human agent can be selected to respond to the service request. In step 515, the human agent can analyze a customer's current system and can develop a solution. The solution can result in system 100 or any system where Web pages can be searched with results improved by a browsing-time factor, such as a system that performs the steps of method 400.

In step 520, the human agent can configure the customer's system to include a search provider, a result refinement engine, and behavior capture engine, in step 525, the human agent can optionally add a result refinement engine and a behavior capture engine to a system that already contains a search provider. The human agent can perform steps 520 and 525 and/or can configure a computing device of the customer in a manner that the customer or clients of the customer can perform steps 520 and 525 using the configured system in the future. For example, the service agent can load and configure software and hardware so that client devices will be capable of searching Web pages using a browsing-time factor. In step 530, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for searching Web pages comprising:
identifying query criteria entered into a search provider;
determining a plurality of Web pages that satisfy the query criteria;
ascertaining a page ranking for each of the plurality of Web pages, wherein each page ranking is based upon at least one relevancy factor; and
presenting ordered results for the query criteria, which are ordered by the ascertained page rankings, wherein the at least one relevancy factor includes a browsing-time factor, wherein the browsing-time factor is based in part upon a time spent at a browsed Web page, and wherein the browsing-time factor is adjusted responsive to an adjustment event, wherein the adjustment event indicates a level of user interest in the browsed Web page based on previous browsing of the web page, wherein the level of user interest is determined without regard to time spent at the browsed Web page, wherein the browsing-time factor is adjusted by detecting a positive adjustment event relating to the browsed Web page, and favorably adjusting the browsing-time factor responsive to the positive adjustment event, wherein the positive adjustment event indicates a user interest in the browsed Web page.

2. The method of claim 1, further comprising:
using client-side software to monitor time spent at the browsed Web page; and
conveying data gathered by the client-side software to the search provider, said search provider using the conveyed data to quantify the browsing-time factor.

3. The method of claim 1, wherein a user enters the query criteria into a search Web page, wherein the presenting of results occurs via the search Web page, and wherein the browsing-time factor is quantified based upon a time it takes for the user to return to the search Web page after having selected the browsed Web page from the results presented within the search Web page.

4. The method of claim 1, wherein the time spent at the browsed Web page is an average time spent by a plurality of different users at the browsed Web page responsive to a search based upon criteria similar to the query criteria.

5. The method of claim 4, further comprising:
limiting an affect that each of the different users has upon the browsing-time factor compared to the other ones of the different users so that no one user is able to dominate a calculation of the time spent at the browsed Web page.

6. The method of claim 1, wherein the positive adjustment event comprises at least one event selected from a group consisting of a user viewing the browsed Web page in its entirety, a user downloading a file from the browsed Web page, a user printing at least a portion of the browsed Web page, a user making a purchase from the browsed Web page, a user adding the browsed Web page to a list of browser favorites, a user not accessing other Web pages included in the ordered results after the browsed Web page has been accessed, and a user entering dissimilar criteria from the query criteria a next time the search provider is used by the user.

7. The method of claim 1, wherein said steps of claim 1 are steps performed by at least one of a service agent and a computing device manipulated by the service agent, the steps being performed in response to a service request.

8. A method for ordering a set of Web pages satisfying query criteria comprising:
for each Web page in a set of Web pages satisfying query criteria, assigning a page ranking value based at least in part upon a browsing-time factor;
ordering the Web pages in the set in accordance with the assigned page ranking values; and
presenting the Web pages in order within a search Web page in which the query criteria was entered, wherein the browsing-time factor is based at least in part upon a time spent by at least one user at an associated browsed Web page, which was browsed responsive to a user selection of a hyperlink presented within the search Web page, said hyperlink being presented as part of a result set from at least one previous query having criteria similar to the query criteria, and wherein the browsing time factor is adjusted responsive to an adjustment event, wherein the adjustment event indicates a level of user interest in the browsed Web page as part of a result set from at least one previous query having criteria similar to the query criteria, wherein the level of user interest is determined without regard to time spent at the browsed Web page, wherein the browsing-time factor is adjusted by detecting a negative adjustment event relating to the browsed Web page, and unfavorably adjusting the browsing-time factor responsive to the negative adjustment event, wherein the negative adjustment event indicates a user disinterest in the browsed Web page.

9. The method of claim 8, wherein the time spent at the browsed Web page is an average time spent by a plurality of different users at the browsed Web page response to a search based upon criteria similar to the query criteria.

10. The method of claim 9, further comprising:
limiting an affect that each of the different users has upon the browsing-time factor compared to the other ones of the different users so that no one user is able to dominate a calculation of the time spent at the browsed Web page.

11. The method of claim 8, wherein the negative adjustment event comprises at least one event selected from a group consisting of a user not viewing the entirety of the browsed Web page, a user adding the browsed Web page to a list of Web pages blocked by a firewall, a user accessing other ones of the Web pages included in the ordered results, and a user entering similar criteria to the query criteria a next time the search provider is used by the user.

12. A system for ordering a set of Web pages comprising:
a computer executing a search provider configured to search Web pages for a user-entered query criteria; and
a computer executing a result refinement engine configured to apply relevancy algorithms, wherein said relevancy algorithms order Web pages based on at least one relevancy factor, wherein the at least one relevancy factor includes a browsing-time factor, wherein the browsing-time factor is based in part upon a time spent at a browsed Web page, and wherein the browsing time factor is adjusted responsive to an adjustment event, wherein the adjustment event indicates a level of user interest in the browsed Web page based on previous browsing of the web page, wherein the level of user interest is determined without regard to time spent at the browsed Web page, wherein the browsing time factor is adjusted by detecting a negative adjustment event relating to the browsed Web page, and unfavorably adjusting the browsing-time factor responsive to the negative adjustment event, wherein the negative adjustment event indicates a user disinterest in the browsed Web page.

13. The system of claim 12, further comprising:
at least one client, wherein the at least one client includes a behavior capture engine configured to capture data used to determine the browsing-time factor of the browsed Web page.

14. The system of claim 12, further comprising:
a server configured to serve a set of Web pages containing content derived from results of said search provider, wherein the server includes a return-to-engine timer configured to capture data used to determine the browsing-time factor of the browsed Web page.

* * * * *